United States Patent

Trumpp et al.

Patent Number: 5,121,111
Date of Patent: Jun. 9, 1992

[54] BROADBAND SIGNAL SWITCHING NETWORK WITH RESPECTIVE THRESHOLD-VALUE HOLDING FEEDBACK MEMBER

[75] Inventors: Gerhard Trumpp, Puchheim; Jan Wolkenhauer, Munich, both of Fed. Rep. of Germany

[73] Assignee: Siemens Aktiengesellschaft, Munich, Fed. Rep. of Germany

[21] Appl. No.: 552,125

[22] Filed: Jul. 13, 1990

[51] Int. Cl.$^5$ ............................................. H04B 1/00
[52] U.S. Cl. ............................. 340/825.85; 340/825.91
[58] Field of Search ...................... 340/825.83, 825.85, 340/825.87, 825.89, 825.9, 825.91, 825.92; 379/291, 292; 307/571, 241, 242

[56] References Cited

U.S. PATENT DOCUMENTS

| 4,486,753 | 12/1984 | Saeki et al. | 340/825.91 |
| 4,801,936 | 1/1989 | Hofmann | 340/825.91 |

FOREIGN PATENT DOCUMENTS 0103236 3/1984 European Pat. Off. .
0262479 4/1988 European Pat. Off. .
0219701 10/1988 European Pat. Off. .

OTHER PUBLICATIONS 59-131221, Patent Abstracts of Japan, vol. 8, No. 261, E-281, 1 8, Nov. 30, 1984.
60-139020, Patent Abstracts of Japan, vol. 9, No. 302, E-362, 2025, Nov. 29, 1985.

Primary Examiner—Donald J. Yusko
Assistant Examiner—Dervis Magistre
Attorney, Agent, or Firm—Hill, Van Santen, Steadman & Simpson

[57] ABSTRACT

In a broadband signal switching network with a switching point matrix constructed in FET technology, an input driver circuit is connected for feeding a respective matrix input line, which driver circuit is blocked via an inhibit input when a prescribed signal level is reached on the respective matrix input line which guarantees a safe switch through of the switching element connected with the matrix input line, whereby a further recharging of the matrix input line is prevented.

7 Claims, 3 Drawing Sheets

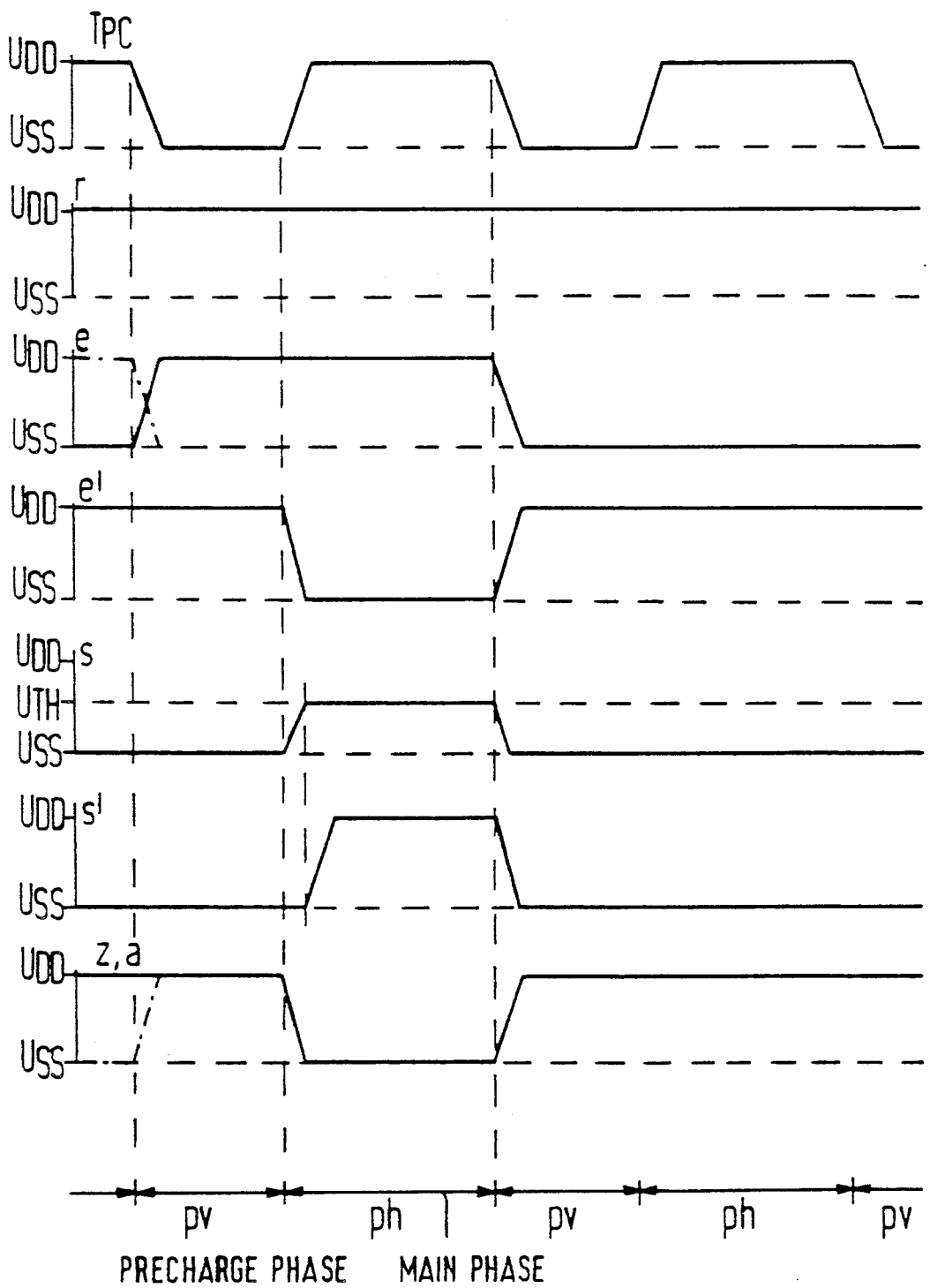

BROADBAND SIGNAL SWITCHING NETWORK WITH RESPECTIVE THRESHOLD-VALUE HOLDING FEEDBACK MEMBER

BACKGROUND OF THE INVENTION

1. Field of the Invention

The present invention relates to broadband signal switching networks and is more particularly concerned with such a network with a switching point matrix constructed in field-effect transistor (FET) technology whose inputs are respectively provided with an input driver and whose outputs can be provided with an output driver, whereby the matrix output lines can be charged in each precharge phase via a precharge circuit controlled by a clock signal dividing a bit through connection interval into a precharge phase and an actual through connecting phase, to a precharge potential residing between two operating potentials or also to one of the two operating potentials, and which is particularly characterized in that the output of the respective input driver is connected via a threshold-value holding feedback member with an inhibit input of the input driver by way of the recharging of the output of the respective input driver is terminated.

2. Description of the Prior Art

Modern developments of telecommunications engineering lead to integrated services message transfer and switching systems for narrow band and broadband communication services, which provide light waveguides as transmission media in the region of the subscriber lines by way of which the narrow band communication services, in particular 64 kbit/s digital telephony, as well as broadband communication services, in particular 140 Mbit/s video telephony, are guided, whereby in the switching stations also narrow band signal switching networks and broadband signal switching networks (preferably with joint control units) can be provided adjacent to one another as in the German Letters Patent 24 21 002).

As known from the European published application 0 262 479, a broadband signal switching network has a switching point matrix constructed in FET technology whose switching elements are respectively composed of a switch transistor charged at its control electrode with a through connect signal or a blocking signal and connected with a main electrode to the appertaining matrix output line, whereby the switching elements respectively have one auxiliary transistor in serial connection with the switch transistor which is connected with its control electrode to the appertaining matrix input line and whose main electrode not facing the serial connection is connected via a sampling transistor with the one terminal of the operating voltage source, with whose other terminal the respective matrix output line is connected via a precharge transistor, and whereby a precharge transistor and a sampling transistor are charged oppositely to one another respectively at their control electrodes with a switching network setting clock dividing a bit through connecting phase into a precharge phase and an actual through connecting phase, so that in each precharge phase, given a blocked sampling transistor, the matrix output line is charged via the precharge transistor at least approximately to the potential prevailing at the mentioned other terminal of the operating voltage source. This known broadband signal switching network which can have sampling transistors individually for the switching elements or sampling transistors individually for the matrix input line or matrix output line requires, for the activation/selection of these sampling transistors, their own clock pulse lines throughout the switching joint matrix which requires a corresponding amount of space and is accompanied by a corresponding capacitive load of the matrix output lines. In order to guarantee sufficient protection from interferences, clock distribution and couplings between matrix input lines and matrix output lines require sufficiently-high signal amplitudes on the matrix output lines which is connected with a relatively high power consumption.

As suggested in the European application 88 11 2908.4, a broadband signal switching network with a switching point matrix constructed in FET technology whose inputs can be provided with an input driver and whose outputs are provided with an output amplifier, whose switching elements, respectively controlled by a hold memory cell, are composed of a serial connection of a switch transistor charged at its control electrode with a through connect or blocking signal and an input transistor connected with its control electrode to the appertaining matrix input line, which is connected with the main electrode not facing the serial connection of the one transistor to the appertaining matrix output line. The matrix output line is connected with a precharge potential source via a precharge circuit which is connected with an unblocking input to the clock signal line of a precharge clock signal defining the precharge phase of a bit through connecting interval divided into a precharge phase and the rest of the bit through connecting interval, so that the matrix output line is charged to a precharge potential in each precharge phase. This arrangement provides a swing limitation of the signal on the output lines of the switching network. For that, the main electrode, not facing the serial connection, of the other transistor of each switching element is connected with the one terminal of the operating voltage source via a transistor provided individually for the matrix output line and connected at its control electrode with the output of an output amplifier circuit provided individually for the matrix output line. Given a change of the signal state at the output of the output amplifier, this transistor is blocked and therefore a further recharging of the output line is prevented, whereby the signal swing on the output line is limited.

A noticeable disadvantage of the known broadband signal switching networks is that a large portion of the required energy must be used for the recharging of the input lines of the switching point matrix.

SUMMARY OF THE INVENTION

The problem of the present invention and therefore an object thereof is to provide a broadband signal switching network with a limitation of the signal swing on the input lines.

The invention relates to a broadband signal switching network with a switching point matrix constructed in FET technology whose inputs are respectively provided with an input driver and whose outputs can be provided with an output driver, whereby the matrix output lines can be charged in each precharge phase with a precharge circuit controlled by a clock signal dividing a bit through connecting interval into a precharge phase and an actual through connecting phase, to a precharge potential residing between the two operating potentials or also to one of the two operating potentials itself. According to the invention, this broadband signal switching network is particularly characterized in that the output of the respective input driver circuit is connected via a threshold-value-holding feedback member with an inhibit input of the input driver circuit by way of which the recharging of the output of the respective input driver circuit is terminated.

The present invention is accompanied by the advantage of a strict limitation of the signal swing on the input lines. The reduction of the signal swing on the input lines leads to a reduction of the recharging losses, which is equivalent to a reduced power consumption. With the reduced power consumption comes a corresponding reduced power dissipation which permits an increase optimally of the packing density of switching elements or of the switching frequency. A further result of the reduced power consumption is a reduction of disturbances of the operating voltage of the broadband signal switching network caused by maximum currents. An additional advantage results from the signal swing limitation, a reduction of disadvantageous influences on adjacent signal paths.

As a further embodiment of the invention, the input driver circuit can be composed of an inverter amplifier in whose one operating voltage terminal a transistor is integrated whose control electrode functions as an inhibit input of the input driver circuit. The embodiment permits a particularly simple construction of the input driver circuit.

As a further embodiment of the invention, the input driver circuit is constructed in complementary-metal-oxide-semiconductor (CMOS) technology. Due to this measure, it is possible to drive the input driver circuit in a particularly simple manner.

As a further embodiment of the invention, the feedback member can be composed of a number of CMOS inverter amplifiers. Given this embodiment, the feedback member is constructed in the same technology as the rest of the switching point matrix and can therefore be easily integrated. The switching threshold of such a feedback member composed of CMOS inverter amplifiers depends on the switching threshold of the first CMOS inverter amplifier and typically lies at 40% of the operating voltage feeding the feedback member.

As a further embodiment of the invention, the feedback member is composed of two CMOS inverter amplifiers. By that, the output signal of the feedback member is in phase with the input signal of the feedback member.

According to another embodiment of the invention, the feedback member can be composed of a comparator whose one input is supplied with a reference voltage and whose other input is supplied with the output signal of the respective input driver circuit. This embodiment permits a fixing of the threshold voltage to a certain value.

As a further embodiment of the invention, it is also possible that the feedback member is fed itself via a high impedance resistance. On the one hand, this measure increases the amplification in the region of the switching threshold of the feedback member and, on the other hand, it causes a small switching hysteresis. Both effects improve the switching behavior of the feedback member.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 7 is a graphic illustration of signal states which appear in practicing the present invention.

DESCRIPTION OF THE PREFERRED EMBODIMENTS

Figure 1:
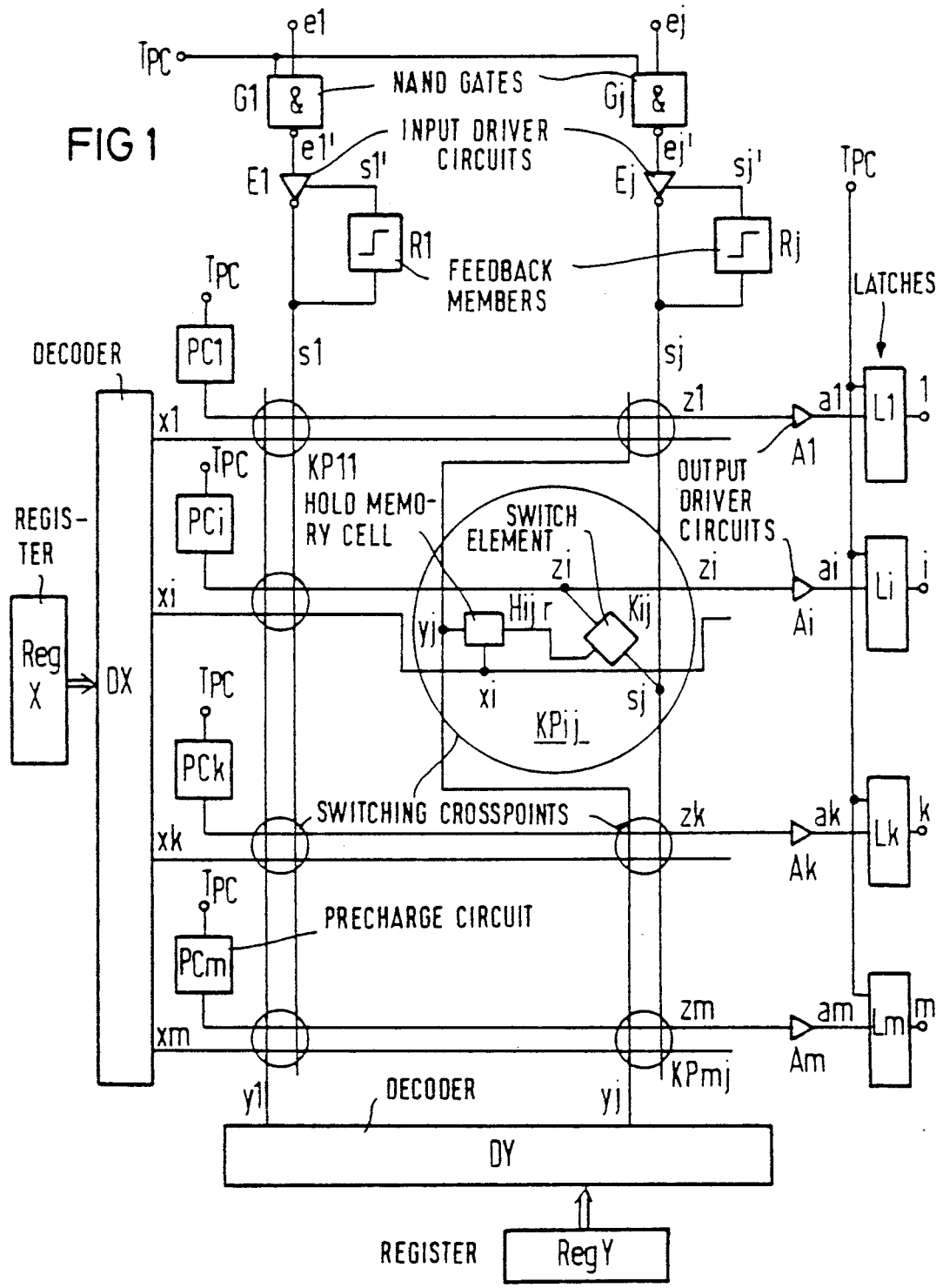
FIG. 1 is a schematic circuit representation of a broadband switching network constructed in accordance with the present invention.

To a degree necessary to comprehend the invention, FIG. 1 schematically illustrates a broadband signal switching network whose lines el-ej are connected respectively via gates G1-Gj controlled by a clock $T_{PC}$ common thereto, and input driver circuits E1-Ej with (matrix input lines) as column lines sl-sj of the switching point matrix, and those, in turn, with the respectively one inhibit input s' of the appertaining input driver circuit E via feedback members Rl-Rj provided individually for the column.

On the one hand, the matrix output lines zl-zm of the witching point matrix are connected with precharge circuits PCl-PCm provided individually for the lines and controlled by a clock $T_{PC}$ common thereto and, on the other hand, with hold latches Ll-Lm via output driver circuits Al-Am, and which in turn, are controlled by a clock $T_{PC}$ common thereto.

The switching point matrix has switching points KPll-KPmj, whose switching elements, as shown at the switching point KPij for its switching element Kij in greater detail, can be controlled respectively by one hold memory cell Hij (at the switching point KPij) provided individually for the switching points, whose output r leads to the control input r of the respective switching element (Kij at the switching point KPij).

According to FIG. 1, the hold memory cells ... Hij ... are selected by two selection decoders, namely a line decoder DX and a column decoder DY via corresponding select lines xl-xm and yl-yj in two coordinates.

As revealed in FIG. 1, from input registers Reg X, Reg Y the two selection decoders DX, DY can be chargeable with a switching point line or switching point column address common to one matrix row (line or column) of switching points, in response to which they deliver a "1" selection signal respectively at the selection line corresponding to the respective switching point row address. The coincidence of the line selection signal "1" and of a column selection signal "1" at the crosspoint of the respective matrix line with the respective matrix column at the set-up of a corresponding connection then causes an activation of the hold memory cell located thereat, e.g. of the memory cell Hij, with the consequence that the switching element, in the example here the switching element Kij, controlled by the respective hold memory cell (Hij) becomes conductive.

In order for the switching element Kij contemplated in the present example to become blocked again given a cleardown of the respective connection, the selection decoder DX is again charged from the input register Req X with the respective line address so that the line decoder DX again delivers a line selection signal "1" on its output line xi, and simultaneously, the column decoder DY is charged from its input register Reg Y, e.g. with a blank address or with the address of a column of uncharged switching points, so that it delivers a column selection signal "0" on its output line yj. The coincidence of the line selection signal "1" and the column selection signal "0" causes the setback of the hold memory cell Hij with the consequence that the switching element Kij controlled thereby is blocked.

Figure 2:
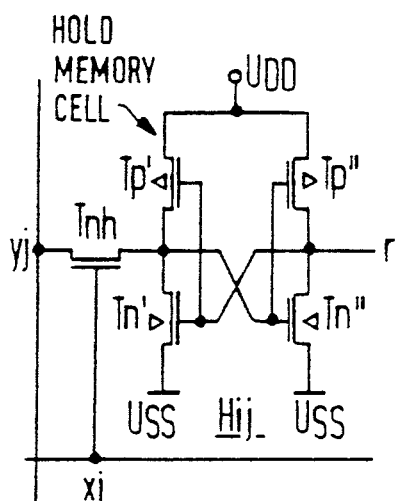
FIG. 2 is a schematic circuit diagram of a switching element which may be employed in practicing the present invention.

The hold memory cells . . . Hij . . . can be fashioned in an actually known manner; therefore, the hold memory cells can be composed, as is known from the European patent EP-1-0 238 834 and as also shown in FIG. 2, e.g. of an n-channel transistor Tnh and two cross-coupled converter circuits (CMOS inverter circuits Tp', Tn'; Tp'', Tn'', whereby on the input side, one inverter circuit is connected with the appertaining decoder output yj of the one selection decoder via the n-channel transistor Tnh, which on its part is charged at its control electrode with the output signal of the appertaining decoder output xi of the other selection decoder, and whereby on the output side one inverter circuit leads to the control input r of the appertaining switching element.

Figure 3:
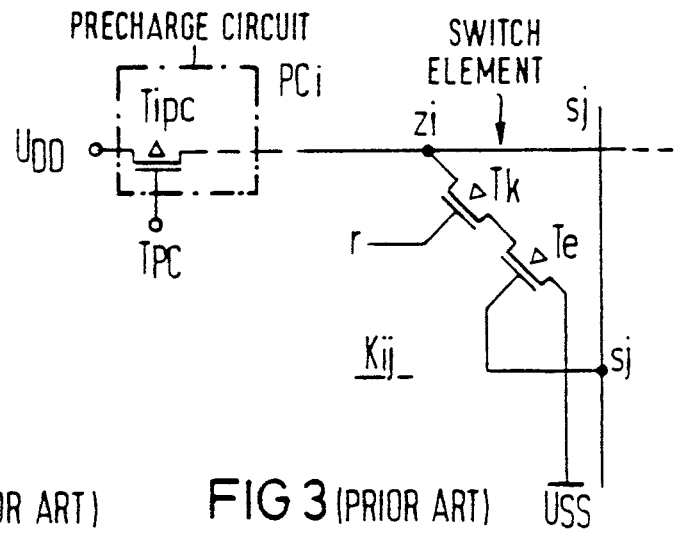
FIG. 3 is a schematic circuit diagram of the construction and interconnection of switching elements which can be employed in practicing the present invention, in particular the serial connection of a switching transistor and an input transistor between a matrix input line, shown as a column line, and a matrix output line.

FIG. 3 illustrates how the switching elements . . . Kij . . . can be realized in circuit-oriented terms. The switching elements . . . Kij . . . are respectively composed of a series connection of a switch transistor Tk charged at its control electrode from the direction of the holding memory cell with a through connect signal or a blocking signal and an input transistor Te connected with its control electrode to the appertaining (matrix input line) column line sj, which is connected with the main electrode, not facing the serial connection, of the one transistor Tk to the appertaining matrix output line zi.

The matrix output line zi is connected via a precharge circuit PC with a precharge potential source from which the matrix output line zi can be charged to a precharge potential lying between the two operating potentials or to one of the two operating potentials. A precharge potential source for a precharge potential lying between the two operating potentials can be composed in a basically known manner, e.g. from the European application EP-A-0 249 837 of a recoupled CMOX inverter by way of which respectively in a precharge phase of a bit through connecting interval, the line-side line zi of the exemplary embodiment illustrated in FIG. 3 is connected with the one terminal $U_{DD}$ of the operating voltage source $U_{DD}$-$U_{SS}$ via a precharge circuit which, as shown in FIG. 3 is composed in an actually known manner of a precharge transistor Tipc lying with its control electrode at a precharge clock line $T_{PC}$.

The main electrode, not facing the serial connection, of the other transistor Te is connected in a continuous fashion, i.e. not clock controlled, with the other terminal $U_{SS}$ (ground) of the operating voltage source $U_{DD}$-$U_{SS}$.

Figure 4:
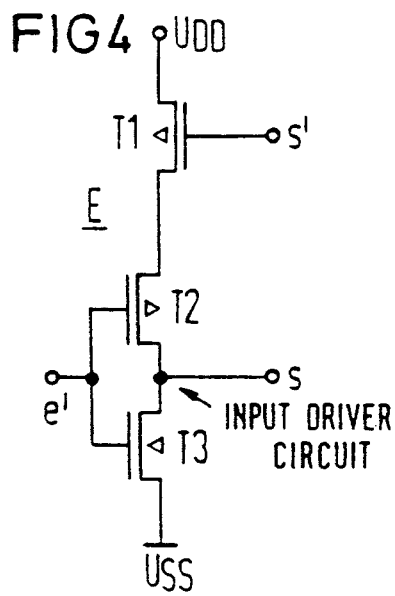
FIG. 4 is a schematic circuit diagram of an input driver circuit which may be employed in practicing the present invention.

FIG. 4 illustrates the construction of the input driver circuits E1-Ej. The input driver circuit E according to FIG. 4 is constructed with a CMOS inverter composed of two transistors T2, T3 whose one operating voltage terminal is directed connected with the operating voltage source $U_{DD}$-$U_{SS}$ and those other operating voltage terminal is connected with the operating voltage source $U_{DD}$-$U_{SS}$ via a transistor T1. The control electrode of the transistor T1 functions as an inhibit input s' of the input amplifier E, the connection of the control electrodes of the transistors T2 and T3 function as the input e' of the input driver circuit E and the connection of the main electrodes of the transistors T2 and T3 function as an output of the driver circuit E which is connected with the respective column line s.

Figure 5:
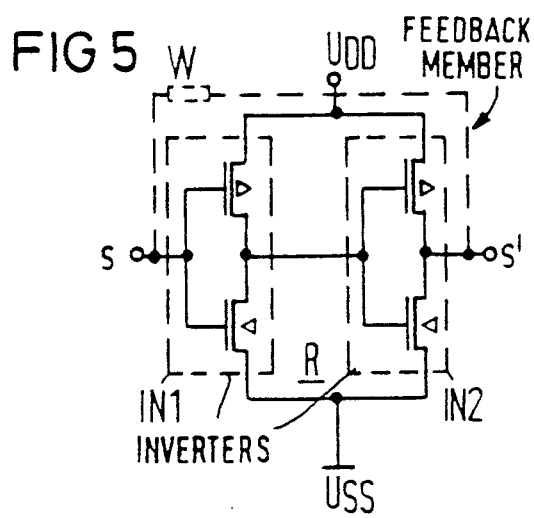
FIG. 5 is a schematic circuit diagram of a threshold-value holding feedback circuit.

FIG. 5 illustrates the circuit-related construction of the threshold-value holding feedback members Rl-Rj.

The feedback members Rl-Rj are composed of a chain connection of two CMOS inverters IN1, IN2, whereby the respective column line s is connected with the control electrodes of the complementary transistor pair functioning as the first CMOS inverter IN1, and the connecting point of the main electrodes of the first transistor pair is connected with the control electrodes of the transistor pair operating as a second CMOS inverter IN2. The connection of the two main electrodes of the second transistor pair forms the output s' of the respective feedback member Rl-Rj. The characteristic switching threshold of such a feedback member R composed of CMOS inverters IN1, IN2 is dependent on the threshold voltage $U_{TH}$ of the first inverter IN1 and lies approximately at 40% of the operating voltage feeding the feedback member R. Accordingly, the switching threshold for the feedback member R according to FIG. 5 lies at approximately 2 V for an operating voltage $U_{DD}$-$U_{SS}$ of 5 V.

Figure 6:
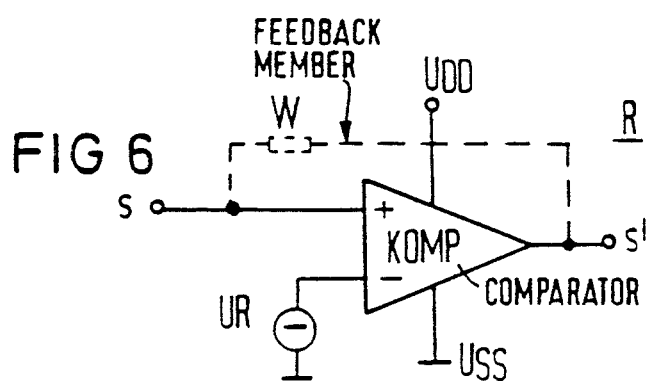
FIG. 6 is a schematic diagram of a threshold-value holding feedback member.

As an alternative to the embodiment of the feedback members Rl-Rj shown in FIG. 5, the feedback member R corresponding to FIG. 6 can be composed of a comparator KOMP, as it can be given for example by an operational amplifier, whose noninverting input (+) is connected with the respective matrix input line, the column line s, and whose inverting input (−) is connected with the one terminal of a reference voltage source UR, and whose other terminal is connected with one terminal of the operating voltage source $U_{DD}$-$U_{SS}$. The output of the comparator KOMP functions as a terminal for the inhibit input s' of the input driver circuit E. The switching threshold $U_{TH}$ of such a feedback member R corresponds to the voltage magnitude at the inverting input (−) of the comparator KOMP.

The feedback members R according to FIG. 5 and according to FIG. 6 can be feedback themselves by way of a high impedance resistance W, which connects the output s' with the input s of the feedback member R, and which, on the other hand, causes an increase of amplification in the region of the switching threshold and, on the other hand, a small hysteresis of the switching threshold. Both effects improve the switching behavior of the feedback member R.

The output driver circuits A1-Am can be constructed basically in the same manner as the feedback members R according to FIG. 5.

The latches L1-Lm operate as outputs of the switching point matrix and are sufficiently known to those skilled in the art and therefore it should not be necessary to describe the same in detail herein.

For two successive bit through connect intervals, FIG. 7 illustrates the transmission of a HIGH signal and, subsequently of a LOW signal (see line e) e.g. from one input ej (FIG. 1) to one output ai (FIG. 1) of the switching point matrix of FIG. 1.

With a corresponding (in the present example LOW signal) clock signal $T_{PC}$ (line $T_{PC}$ in FIG. 7) charging the control electrode of each precharge transistor (Tipc of FIG. 3) is effected such that in each precharge phase pv (FIG. 7, bottom) of a bit interval divided by the clock signal $T_{PC}$ in such a precharge phase pv and a subsequent main phase (phase ph in FIG. 7) each precharge transistor (Tipc of FIG. 3) is conductive, so that during the precharge phase pv the matrix output lines zl-zm are charged via the respective precharge transistor (Tipc) to a precharge potential lying between the two operating potentials or even to one of the two operating potentials (see FIG. 7, line z, a, a dash-dot line).

In the subsequent main phase ph (see FIG. 7, bottom) the precharge transistors Tipc of FIG. 3 are blocked in the example by a HIGH clock signal $T_{PC}$ (see FIG. 7, line $T_{PC}$) Simultaneously, the matrix input-side gates Gl-Gj are unblocked. By that, the signals residing at the input lines of the switching point matrix el-ej are switched through in the present example in inverted form to the input e' of the respective input driver circuit E. A HIGH signal e.g. residing at the input line ej (see FIG. 7, line 3) thus causes a LOW signal at the input ej' of the input driver circuit ej (see FIG. 7, line 3').

According to the present invention, the input driver circuit E charges the matrix input line, that is the column line s, connected with its output for a (in the present example LOW signal) signal residing at the input e' of the input driver circuit e until (FIG. 7 line s) the charge flow is interrupted by blocking the transistor T1 (FIG. 4). In the example a HIGH signal suitable for blocking the transistor T1 is thereby supplied by a threshold value holding feedback member R according to FIG. 5 or FIG. 6, whose input connected with the respective matrix input line (column line s) achieves a prescribed threshold voltage $U_{TH}$ (see FIG. 7, lines s, s').

The threshold value $U_{TH}$ is thereby dimensioned such that it is safely guaranteed that the input transistors (Te in FIG. 3) connected with their control electrode with the respective column line s (matrix input line) become conductive. If, in a switching element Kij, its switch transistor Tk (FIG. 3) is conductive due to a (in the present example HIGH) through connect condition, the line z (matrix output line) connected via the throughswitched switching element Kij with the column line s (matrix input line) is discharged to the one potential of the operating voltage $U_{DD}$-$U_{SS}$ (in the present example $U_{SS}$, ground) via the transistor Te and Tk.

A signal state residing at the respective matrix input line (column line s) is thereby switched through in inverted fashion via the respective switching point unblocked from the direction of its control input r (see FIG. 7, lines s; z, a).

Towards the end of the main phase ph, the LOW signal waiting at the output ai of the output driver circuit Ai (see FIG. 7, line z, a) is taken over into the appertaining latch Li, for example with the signal change of the precharge clock signal $T_{PC}$ leading from the HIGH condition into the LOW condition, the gates Gl-Gj are blocked, i.e. all the inputs e' of the input driver circuits e have HIGH signals thereon in the present example, whereby all transistors T3 (FIG. 4) are switched conductive and by that all matrix input lines (column lines sl-sj) are discharged (see FIG. 7, line s), the feedback members R fall back into the starting condition (in the present example the LOW condition) as illustrated (see FIG. 7, line s') and the transistors T1 (FIG. 4) are thereby rendered conductive.

In the subsequent bit throughswitching interval, now a LOW signal may be transmitted according to FIG..7 via the contemplated input line ej. In the precharge phase pv, first of all, all matrix output lines (the line-side lines zl-zm) are again precharged.

In the following main phase ph, the switch transistor Tk in the contemplated switching point (FIG. 3) is again to be in the switched through condition (see FIG. 7, line r) due to a (in the present example HIGH) control signal r. Since, at the input line ej a LOW signal resides (see line e of FIG. 7) the appertaining matrix input line (the column line sj) likewise remains in the LOW condition with the consequence that the input transistor Te in the contemplated switching point (FIG. 3) remains blocked, the appertaining matrix output line (the line-side line zi is not discharged and the signal state at the contemplated output line ai remains preserved (see FIG. 7, line z, a). Towards the end of this main phase ph, a HIGH signal is therefore taken over in the latch Li.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a broadband signal switching network of the type in which a switching matrix constructed in accordance with FET technology includes a plurality of inputs each connected to an input driver circuit and a plurality of outputs each connected to an output driver circuit, and in which the matrix includes matrix input lines connected to outputs of the input driver circuits, and matrix output lines which are each respectively connected to a precharge circuit, and wherein the respective output line can be charged in a precharge phase via the precharge circuit controlled by a clock signal which divides a bit through connect interval into a precharge phase and a main through connect phase to a precharge potential lying in a range between and including two operating potentials, the improvement wherein:

each of said input driver circuits comprises said input, an output and an inhibit input; and a respective threshold-value holding feedback member is connected between said output and said inhibit input to terminate a recharging of said output of said input driver circuit by blocking the corresponding input driver circuit when a threshold voltage of the feedback member is reached so as to reduce signal swing on the respective input matrix line to reduce recharging losses.

2. The improved broadband signal switching network of claim 1, wherein each of said input driver circuits comprises:

an inverter amplifier including an operating voltage terminal and a transistor connected between said operating voltage terminal and said inverter amplifier, and a control electrode of said transistor forming said inhibit input.

3. The improved broadband signal switching network of claim 1, wherein each of said input driver circuits is constructed in CMOS technology.

4. The improved broadband signal switching network of claim 1, wherein:
each of said threshold-value holding feedback members is constructed of a number of CMOS inverter amplifiers.

5. The improved broadband signal switching network of claim 4, wherein each of said feedback members is composed of two CMOS inverter amplifiers.

6. The improved broadband signal switching network of claim 4, wherein:
each of said feedback members comprises a comparator including a first input connected to a reference voltage and a second input connected to said output of the respective input.driver circuit.

7. The improved broadband signal switching network of claim 4, wherein:
each of said feedback members comprises a high-impedance feedback resistor.

* * * * *